United States Patent
Luo et al.

(10) Patent No.: US 11,895,621 B2
(45) Date of Patent: Feb. 6, 2024

(54) SIDELINK OPERATION

(71) Applicant: QUALCOMM Incorporated, San Diego, CA (US)

(72) Inventors: Tao Luo, San Diego, CA (US); Sony Akkarakaran, Poway, CA (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/898,033

(22) Filed: Jun. 10, 2020

(65) Prior Publication Data

US 2020/0396717 A1  Dec. 17, 2020

Related U.S. Application Data

(60) Provisional application No. 62/862,611, filed on Jun. 17, 2019.

(51) Int. Cl.
*H04W 72/02* (2009.01)
*H04W 72/0453* (2023.01)
(Continued)

(52) U.S. Cl.
CPC ............ *H04W 72/02* (2013.01); *H04L 5/001* (2013.01); *H04L 5/0092* (2013.01);
(Continued)

(58) Field of Classification Search
None
See application file for complete search history.

(56) References Cited

U.S. PATENT DOCUMENTS

2014/0254401 A1* 9/2014 Talwar ................ H04W 52/383
370/252
2014/0274088 A1* 9/2014 Talwar ................ H04J 11/0023
455/452.1
(Continued)

FOREIGN PATENT DOCUMENTS

WO  2018026991 A1  2/2018
WO  2018117775 A1  6/2018
(Continued)

OTHER PUBLICATIONS

International Search Report and Written Opinion—PCT/US2020/037220—ISA/EPO—dated Sep. 11, 2020.
(Continued)

*Primary Examiner* — Srinivasa R Reddivalam
(74) *Attorney, Agent, or Firm* — Sevan Savsa; Patterson & Sheridan LLP

(57) ABSTRACT

Certain aspects of the present disclosure provide techniques for sidelink operation. A method that may be performed by a first user equipment (UE) includes generating at least one first message indicating a request for resource allocation for sidelink communication between the first UE and a second UE, transmitting the at least one message indicating the request for the resource allocation, receiving at least one second message allocating one or more first component carriers for the sidelink communication, and communicating with the second UE using the one or more first component carriers.

28 Claims, 12 Drawing Sheets

(51) Int. Cl.
*H04L 5/00* (2006.01)
*H04W 72/0446* (2023.01)
*H04W 92/18* (2009.01)

(52) U.S. Cl.
CPC ... *H04W 72/0446* (2013.01); *H04W 72/0453* (2013.01); *H04W 92/18* (2013.01)

(56) References Cited

U.S. PATENT DOCUMENTS

| | | | | |
|---|---|---|---|---|
| 2015/0189685 | A1* | 7/2015 | Yao | H04W 76/14 455/552.1 |
| 2016/0183241 | A1* | 6/2016 | Lee | H04W 56/0015 455/425 |
| 2017/0250842 | A1* | 8/2017 | Han | H04B 17/336 |
| 2017/0251485 | A1* | 8/2017 | Kalhan | H04W 76/14 |
| 2017/0367059 | A1 | 12/2017 | Park et al. | |
| 2018/0324842 | A1 | 11/2018 | Gulati et al. | |
| 2019/0037604 | A1 | 1/2019 | Akkarakaran et al. | |
| 2019/0037621 | A1* | 1/2019 | Feng | H04W 76/14 |
| 2019/0141539 | A1 | 5/2019 | Yerramalli et al. | |
| 2019/0159150 | A1* | 5/2019 | Nguyen | H04W 4/70 |
| 2019/0174533 | A1 | 6/2019 | Lee et al. | |
| 2020/0137724 | A1* | 4/2020 | Kim | H04W 72/04 |
| 2020/0288535 | A1* | 9/2020 | Sharma | H04W 36/0033 |
| 2020/0374864 | A1* | 11/2020 | Kuang | H04W 72/51 |
| 2021/0250931 | A1* | 8/2021 | Yang | H04L 5/0053 |

FOREIGN PATENT DOCUMENTS

| | | |
|---|---|---|
| WO | 2018175553 A1 | 9/2018 |
| WO | 2019061195 A1 | 4/2019 |

OTHER PUBLICATIONS

ZTE: "Discussion on Carrier Selection in PC5 CA", 3GPP TSG-RAN WG2 Meeting #100, 3GPP Draft; R2-1713070, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 27, 2017-Dec. 1, 2017, Nov. 17, 2017, 6 Pages, XP051371898, Retrieved from the Internet: URL:http://www.3gpp.org/ftp/tsg_ran/WG2_RL2/TSGR2_100/Docs/ [retrieved on Nov. 17, 2017], Section 2.

* cited by examiner

SIDELINK OPERATION

CROSS-REFERENCE TO RELATED APPLICATIONS

This application claims priority to provisional application 62/862,611, filed Jun. 17, 2019, which is assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink communication efficiency.

Certain aspects of the present disclosure are directed to a method for wireless communication at a first user-equipment (UE). The method generally includes generating at least one first message indicating a request for resource allocation for sidelink communication between the first UE and a second UE, transmitting the at least one message indicating the request for the resource allocation, receiving at least one second message allocating one or more first component carriers for the sidelink communication, and communicating with the second UE using the one or more first component carriers.

Certain aspects of the present disclosure are directed to a method for wireless communication. The method generally includes receiving, from a first UE, at least one first message indicating a request for resource allocation for sidelink communication between the first UE and a second UE, generating at least one second message allocating one or more first component carriers for the sidelink communication, and transmitting the at least one second message to the first UE.

Certain aspects of the present disclosure are directed to an apparatus for wireless communication by a first UE. The apparatus generally includes a memory, and one or more processors coupled to the memory, the memory and the one or more processors being configured to generate at least one first message indicating a request for resource allocation for sidelink communication between the first UE and a second UE, transmit the at least one message indicating the request for the resource allocation, receive at least one second message allocating one or more first component carriers for the sidelink communication, and communicate with the second UE using the one or more first component carriers.

Certain aspects of the present disclosure are directed to an apparatus for wireless communication. The apparatus generally includes a memory, and one or more processors coupled to the memory, the memory and the one or more processors being configured to receive, from a first UE, at least one first message indicating a request for resource allocation for sidelink communication between the first UE and a second UE, generate at least one second message allocating one or more first component carriers for the sidelink communication, and transmit the at least one second message to the first UE.

Certain aspects of the present disclosure are directed to an apparatus for wireless communication at a first UE. The apparatus generally includes means for generating at least one first message indicating a request for resource allocation for sidelink communication between the first UE and a second UE, means for transmitting the at least one message indicating the request for the resource allocation, means for receiving at least one second message allocating one or more first component carriers for the sidelink communication, and means for communicating with the second UE using the one or more first component carriers.

Certain aspects of the present disclosure are directed to an apparatus for wireless communication. The apparatus generally includes means for receiving, from a first UE, at least one first message indicating a request for resource allocation for sidelink communication between the first UE and a second UE, means for generating at least one second message allocating one or more first component carriers for the sidelink communication, and means for transmitting the at least one second message to the first UE.

Certain aspects of the present disclosure are directed to a computer-readable medium having instructions stored thereon to cause a first UE to generate at least one first message indicating a request for resource allocation for sidelink communication between the first UE and a second UE, transmit the at least one message indicating the request for the resource allocation, receive at least one second message allocating one or more first component carriers for the sidelink communication, and communicating with the second UE using the one or more first component carriers.

Certain aspects of the present disclosure are directed to a computer-readable medium having instructions stored thereon to cause an apparatus to receive, from a first UE, at least one first message indicating a request for resource allocation for sidelink communication between the first UE and a second UE, generate at least one second message allocating one or more first component carriers for the sidelink communication, and transmit the at least one second message to the first UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
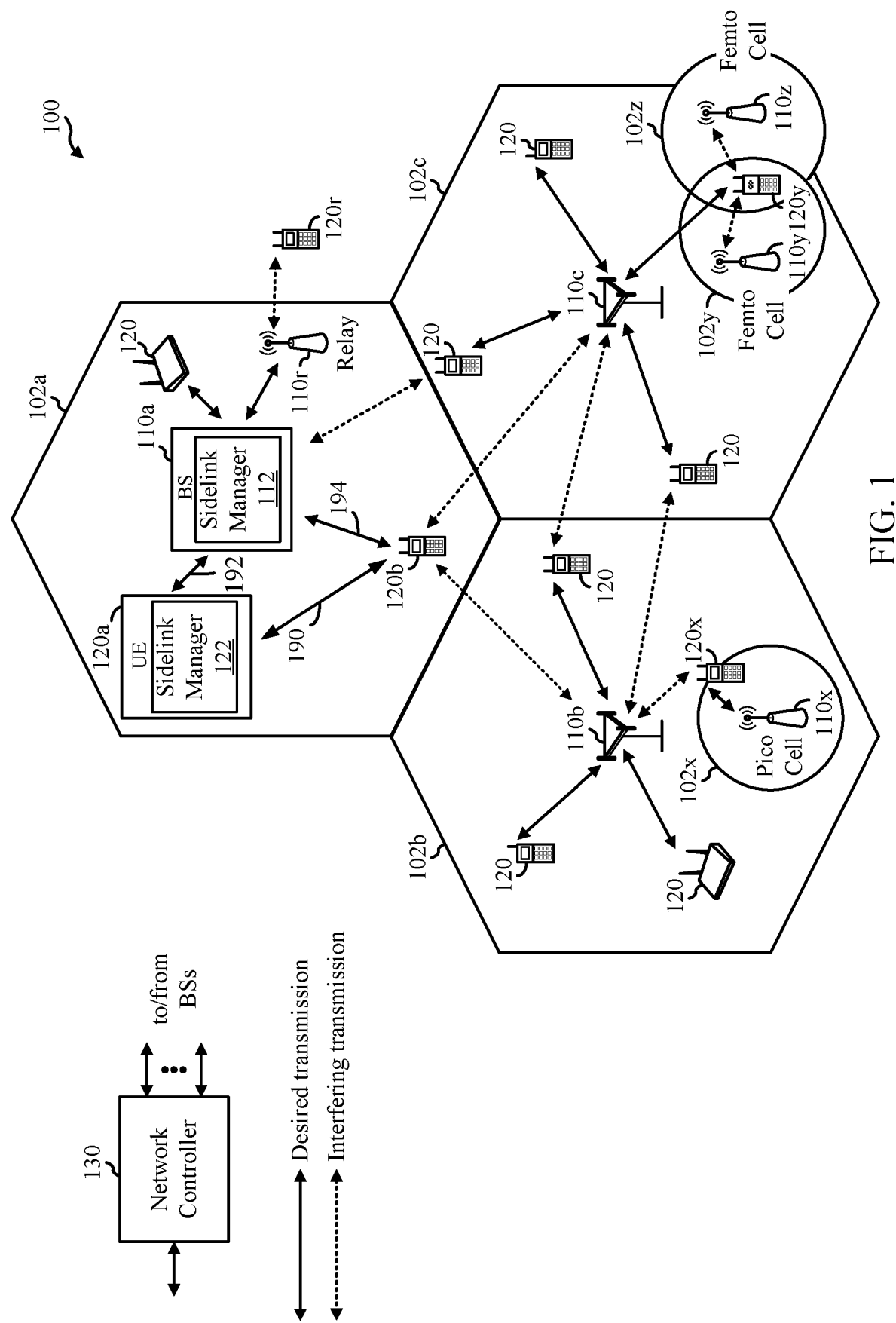
FIG. 1 is a block diagram conceptually illustrating an example telecommunications system, in accordance with certain aspects of the present disclosure.

Certain aspects of the present disclosure provide apparatus, methods, processing systems, and computer readable mediums for configuring sidelink communication. For example, a user-equipment (UE) may request allocation of component carriers for sidelink communication which may be sent to a base station (BS) via an access link. For example, the UE may request allocation of component carriers, and in some cases, also request a specific quantity of component carriers based on UE capabilities and/or an anticipated amount of traffic on the sidelink. In other cases, the UE may request specific component carriers based on previous measurements of interference associated with those carriers. For instance, the UE may perform measurements to determine the radio quality associated with various component carriers, and request that the BS allocate those component carriers for sidelink communication. In some scenarios, the BS may allocate the requested component carriers, but in other scenarios, the BS may be unable to allocate the requested component carriers and may allocate different component carriers.

In some implementations, the UE may receive an indication of a pattern for hopping between component carriers for the sidelink communication. For instance, the UE may use one or more first component carriers in one slot, and use one or more second component carriers in another slot, in accordance with the pattern.

The following description provides examples of traffic burst awareness in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for managing sidelink communications. As shown in FIG. 1, the BS 110a includes a sidelink manager 112. The sidelink manager 112 may be configured to allocate component carriers for sidelink communications (e.g., sidelink 190 between the UE 120a and UE 120b) in response to a request from a UE, in accordance with aspects of the present disclosure. The request may be received via an access link, such as the access link 192 or access link 194, as described in more detail herein.

In some examples, the sidelink manager 112 may consider a specific quantity of component carriers requested by the UE, or specific component carriers requested by the UE for the allocations. As shown in FIG. 1, the UE 120a includes a sidelink manager 122. The sidelink manager 122 may be configured to request resources to be allocated for sidelink communication, in accordance with aspects of the present disclosure. In some examples, the sidelink manager 122 may also include, as part of the request, a preferred quantity of component carriers, or specific component carriers to be allocated, as described in more detail herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 (for example, a mobility management entity (MME) or access and mobility management function (AMF)) may couple to a set of BSs 110 and provide coordination and control for these BSs 110. The network controller 130 may communicate with the BSs 110 via a backhaul (for example, an S1 interface between MME and eNBs, or an NG interface between AMF and gNB). The BSs 110 may also communicate with one another (e.g., directly or indirectly) via wireless or wireline backhaul (for example, an X2 or Xn interface).

Figure 2:
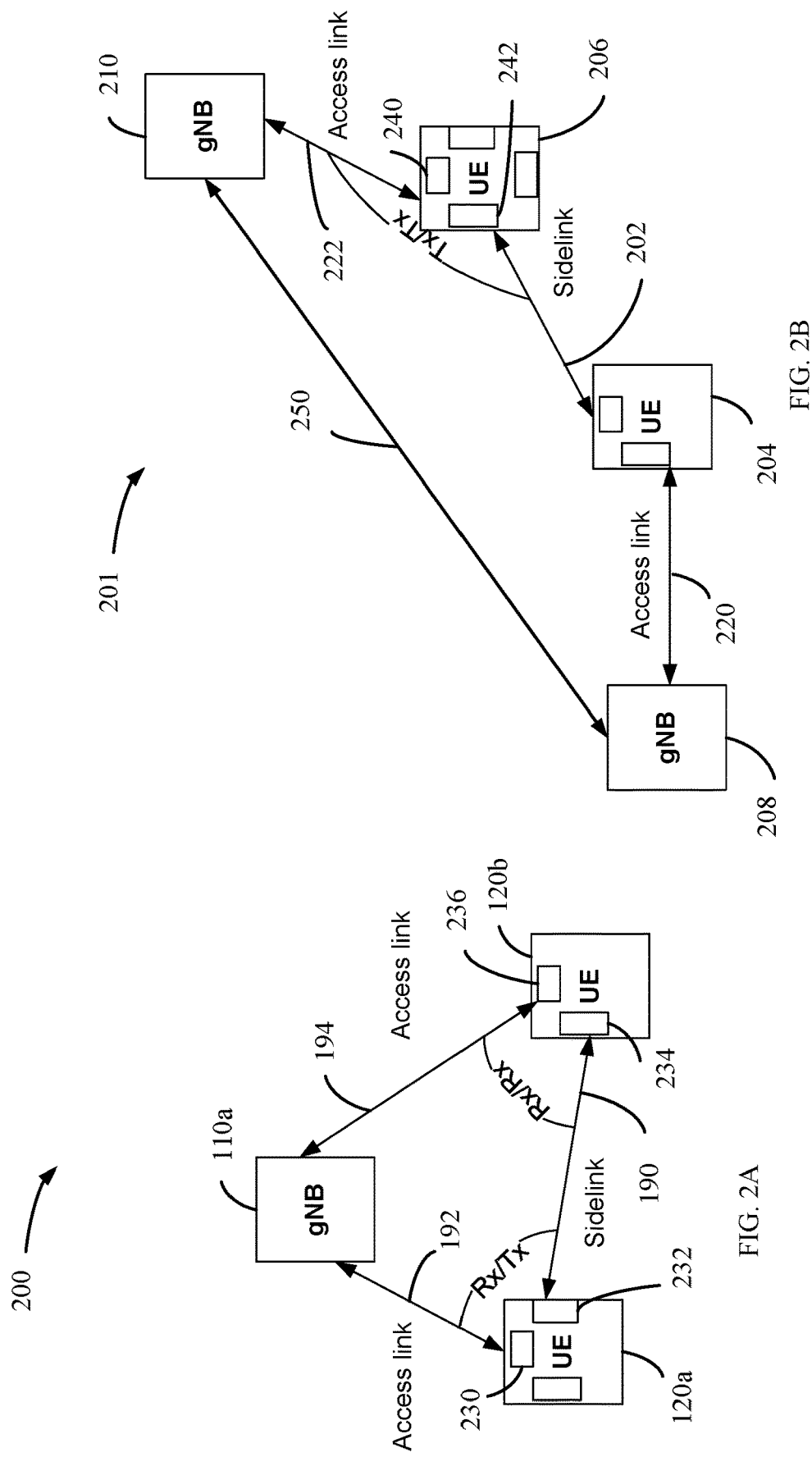
FIGS. 2A and 2B illustrate example wireless communication networks implemented using access link and sidelink.

FIGS. 2A and 2B illustrate example wireless communication networks 200, 201 implemented using an access link and a sidelink. A sidelink generally refers to a communication link between two UEs. For example, the sidelink may include a PC5 interface between vehicles for a vehicle to everything (V2X) protocol.

An access link generally refers to a communication link between a UE and a base station (e.g., a gNodeB (gNB), eNodeB (eNB), or NodeB (NB)). For instance, the access link may be a Uu interface. In some cases, the sidelink may be implemented with a single CC, carrier aggregation (CA), or dual connectivity (DC). The access link may be implemented with a single CC, CA, and for multiple radio access technologies (RATs).

As illustrated in FIG. 2A, a sidelink 190 may be implemented between the UE 120a and the UE 120b. A sidelink 202 may also be implemented between the UE 204 and the UE 206, as illustrated in FIG. 2B. The UEs 120a, 120b may be served by the same base station 110a (e.g., gNB), whereas the UEs 204, 206 may be served by different base stations 208, 210, as illustrated. For instance, an access link 192, 194 may be configured between the BS 110a and each of the UEs 120a, 120b. Moreover, an access link 220, 222 may be configured between a respective one of the BSs 208, 210 and a respective one of the UEs 204, 206. The access link and sidelink may use different component carriers, in certain aspects. In some cases, a UE may act as a wireless relay, reducing the number of BSs with connectivity to the core network (CN) that need to be deployed in any given area.

To facilitate sidelink communication, each of the UEs may include multiple panels (e.g., radio-frequency (RF) front-end (RFFE) circuitry) that allow for simultaneous reception (Rx) and/or transmission (Tx) via separate communication links. For instance, the UE 120a may include a panel 230 which may be used for the reception (Rx) via the access link 192, and a panel 232 which may be used for transmission (Tx) via the sidelink 190, as illustrated. Similarly, the UE 120b may include a panel 234 for Rx via the sidelink 190 and a panel 236 for Rx via the access link 194. As illustrated, the UE 206 may also include a panel 240 for Tx via the access link 222 and a panel 242 for Tx via the sidelink 202. Moreover, the BSs 110a, 208, 210 may also include multiple panels (not shown). While each UE is illustrated with two, three, or four panels to facilitate understanding, the UEs may include any number of panels. In certain aspects, a backhaul interface 250 may be implemented between the BSs 208, 210, as illustrated.

Example Techniques for Sidelink Configuration

Certain aspects of the present disclosure are generally directed to techniques for configuring sidelink communication. For instance, a UE may request allocation of resources and optionally indicate a quantity of component carriers to be allocated for the sidelink depending on the UE capabilities and/or an amount of traffic anticipated on the sidelink. The UE may also indicate specific component carriers in an attempt to reduce interference with other devices, or to avoid conflicts where certain antennas, panels, or other radio-frequency (RF) resources are dynamically shared with alternative technologies (e.g., WiFi or global positioning system (GPS)), but only on specific component carriers.

Figure 3:
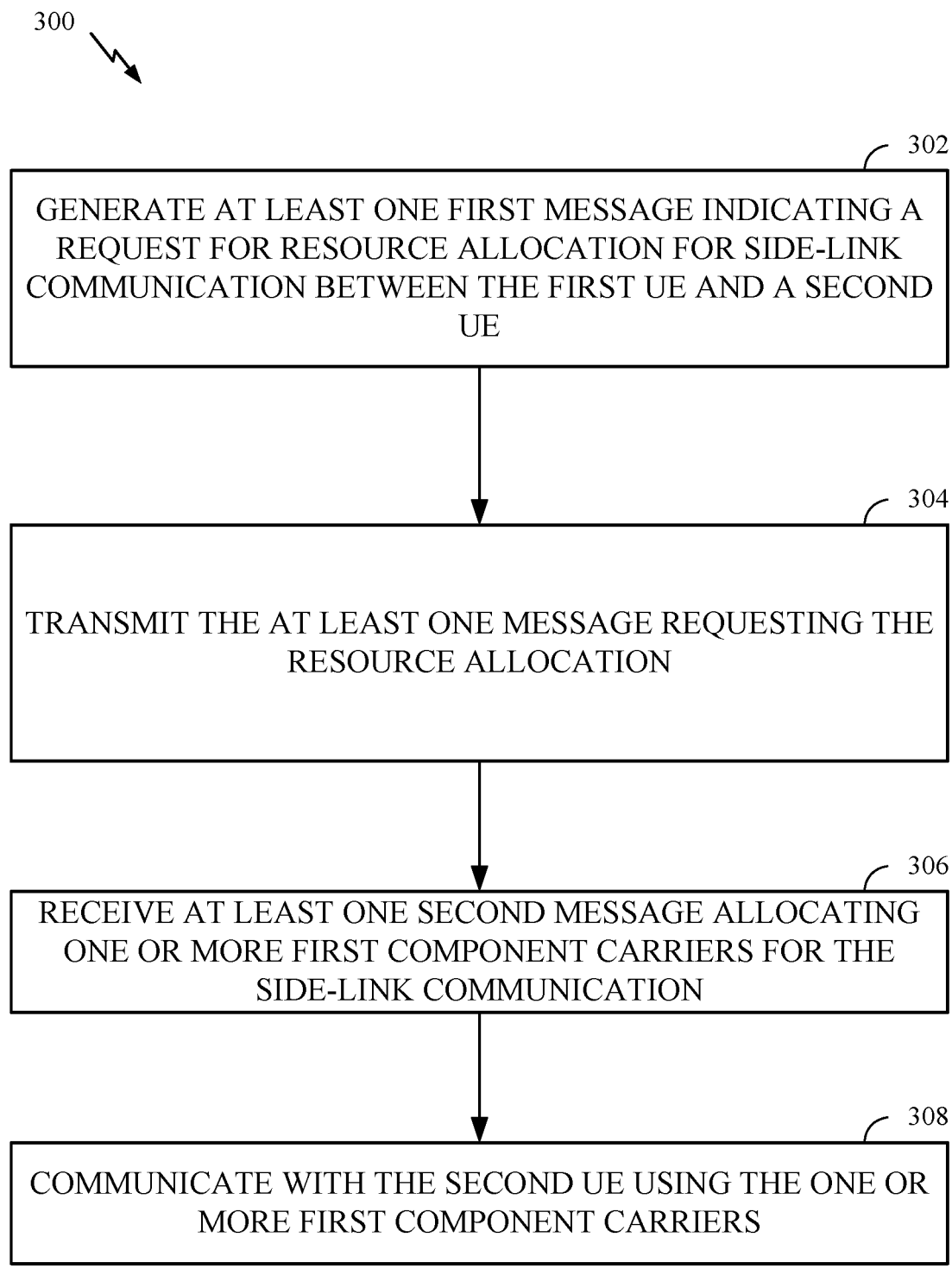
FIG. 3 is a flow diagram illustrating example operations for wireless communication by a user equipment (UE), in accordance with certain aspects of the present disclosure.

FIG. 3 is a flow diagram illustrating example operations 300 for wireless communication, in accordance with certain aspects of the present disclosure. The operations 300 may be performed, for example, by a UE (e.g., such as a UE 120a in the wireless communication network 100).

Figure 12:
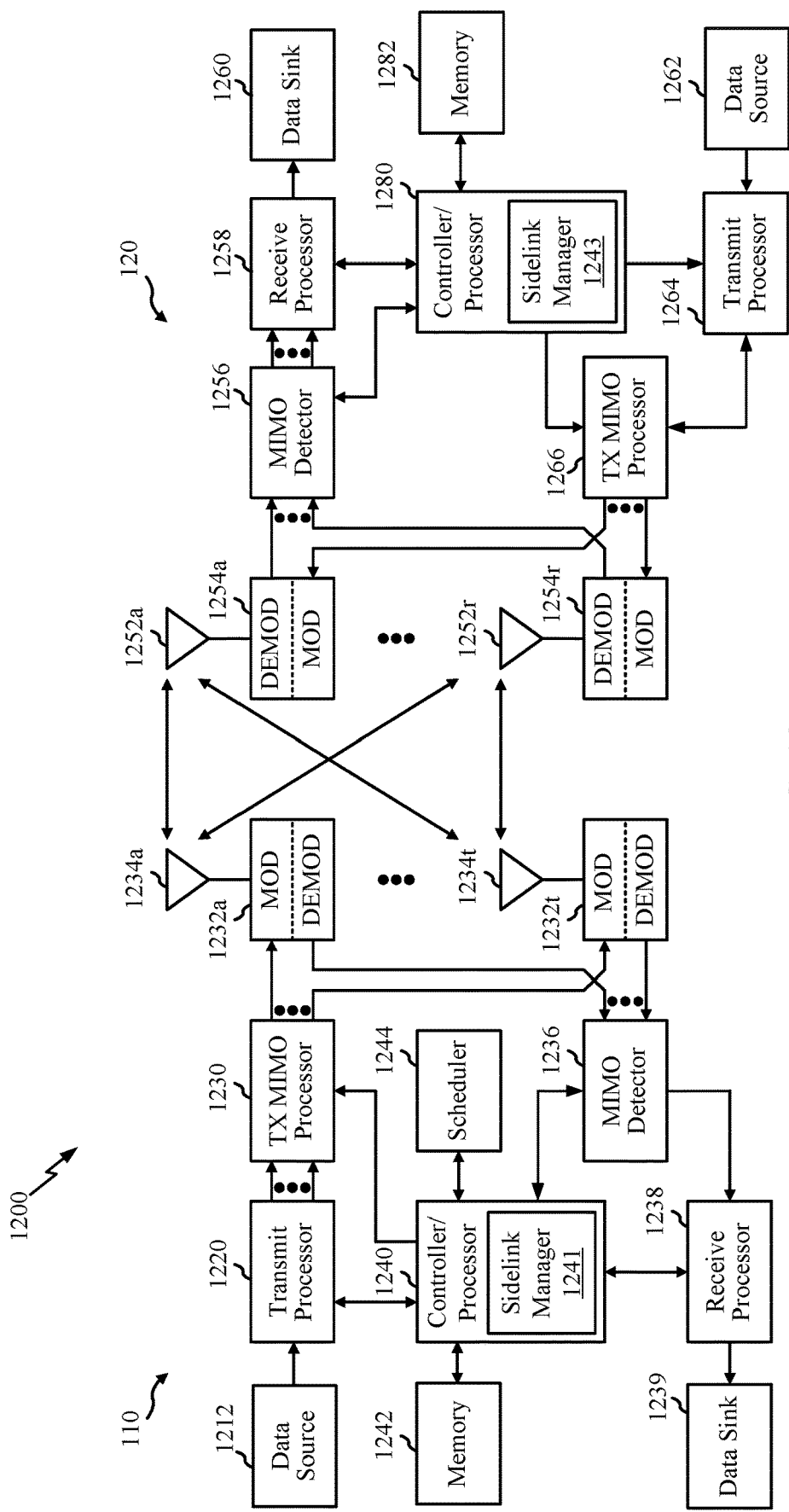
FIG. 12 is a block diagram conceptually illustrating a design of an example base station (BS) and UE, in accordance with certain aspects of the present disclosure.

Operations 300 may be implemented as software components that are executed and run on one or more processors (e.g., controller/processor 1280 of FIG. 12). Further, the transmission and reception of signals by the UE in operations 1200 may be enabled, for example, by one or more antennas (e.g., antennas 1252 of FIG. 12). In certain aspects, the transmission and/or reception of signals by the UE may be implemented via a bus interface of one or more processors (e.g., controller/processor 1280) obtaining and/or outputting signals.

Figure 4:
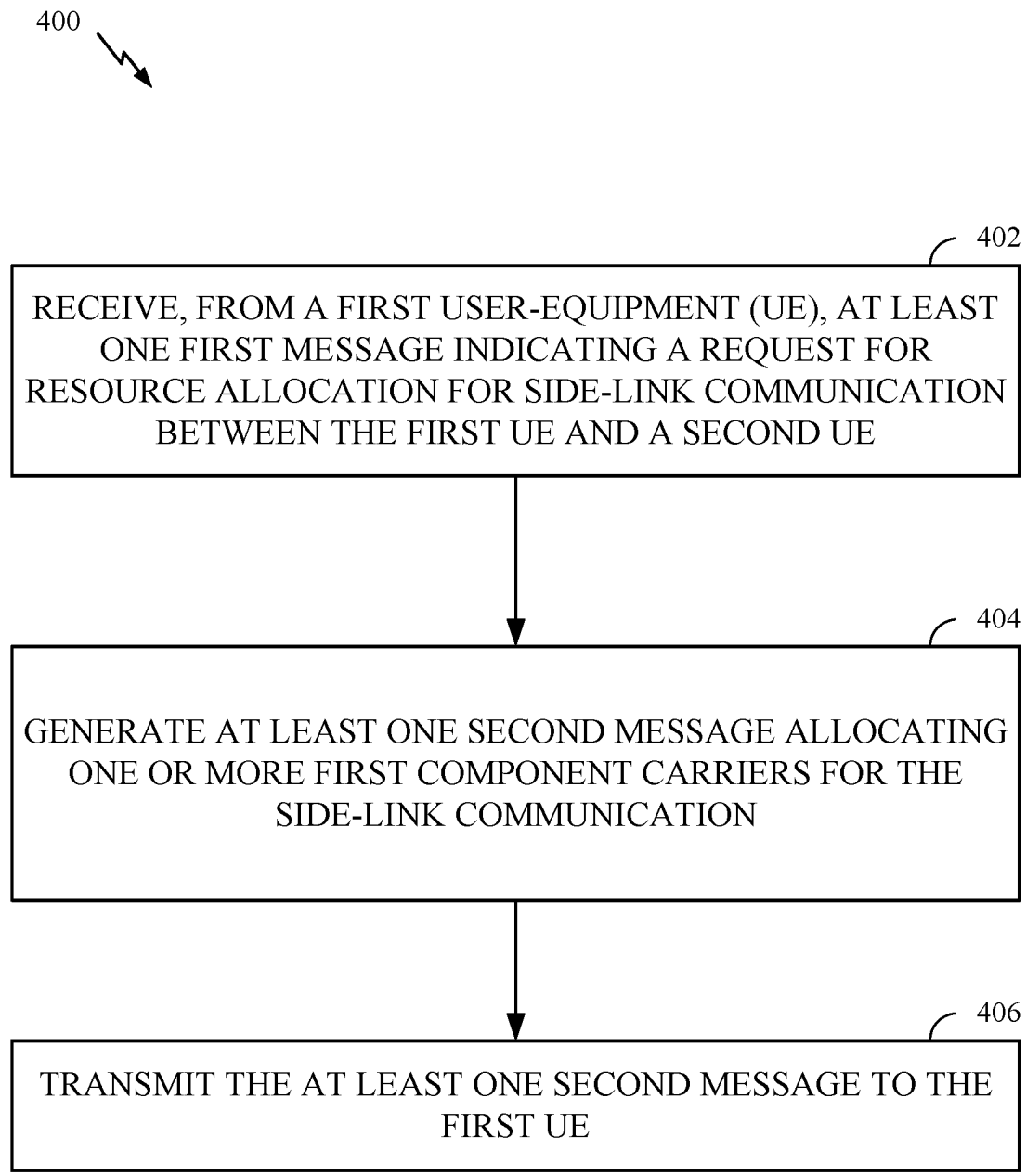
FIG. 4 is a flow diagram illustrating example operations for wireless communication by a management entity, in accordance with certain aspects of the present disclosure.

The operations 300 may begin, at block 302, with the UE generating at least one first message (e.g. also referred to as a resource allocation request) indicating a request for resource allocation for sidelink communication between the first UE (e.g., UE 120a) and a second UE (e.g., UE 120b or UE 206). At block 304, the UE may transmit the at least one first message requesting the resource allocation, and at block 306, may receive at least one second message (e.g., also referred to herein as a resource allocation message) allocating one or more first component carriers for the sidelink communication. At block 308, the UE may communicate with the second UE using the one or more first component carriers FIG. 4 is a flow diagram illustrating example operations 400 for wireless communication, in accordance with certain aspects of the present disclosure. The operations 400 may be performed, for example, by a management entity such as a BS (e.g., BS 110a in the wireless communication network 100) or a UE acting as a wireless relay.

The operations 400 may be complimentary operations by the BS or wireless relay to the operations 300 performed by the UE (e.g., the UE 120a). Operations 400 may be implemented as software components that are executed and run on one or more processors (e.g., controller/processor 1240 of FIG. 12). Further, the transmission and reception of signals by the BS in operations 1200 may be enabled, for example, by one or more antennas (e.g., antennas 1234 of FIG. 12). In certain aspects, the transmission and/or reception of signals by the BS may be implemented via a bus interface of one or more processors (e.g., controller/processor 1240) obtaining and/or outputting signals.

The operations 400 may begin, at block 402, with the management entity receiving, from a first UE, at least one first message indicating a request for resource allocation for sidelink communication between the first UE and a second UE. At block 404, the operations 400 continue with the management entity generating at least one second message allocating one or more first component carriers for the sidelink communication, and at block 406, transmitting the at least one second message to the first UE.

As described herein, the operations 400 may be performed by a UE (e.g., UE 206) acting as a wireless relay. In this case, the operations 400 may include the wireless relay relaying the request for resource allocation to a BS (e.g., BS 110a), and receiving, from the BS, an indication of the one or more first component carriers, the at least one second message allocating the one or more first component carriers being generated based on the indication from the BS. In certain aspects, the operations 400 may also include the wireless relay communicating with the first UE using the one or more first component carriers.

In certain aspects, the operations 400 may be performed by a BS (e.g., BS 110a). In this case, the operations 400 may also include the BS selecting the one or more first component carriers for the sidelink communication, the at least one second message allocating the one or more first component carriers being generated based on the selection. For example, the selection may take into consideration a quantity of component carriers preferred by the UE, or specific component carriers preferred by the UE, as described herein.

Figure 5:
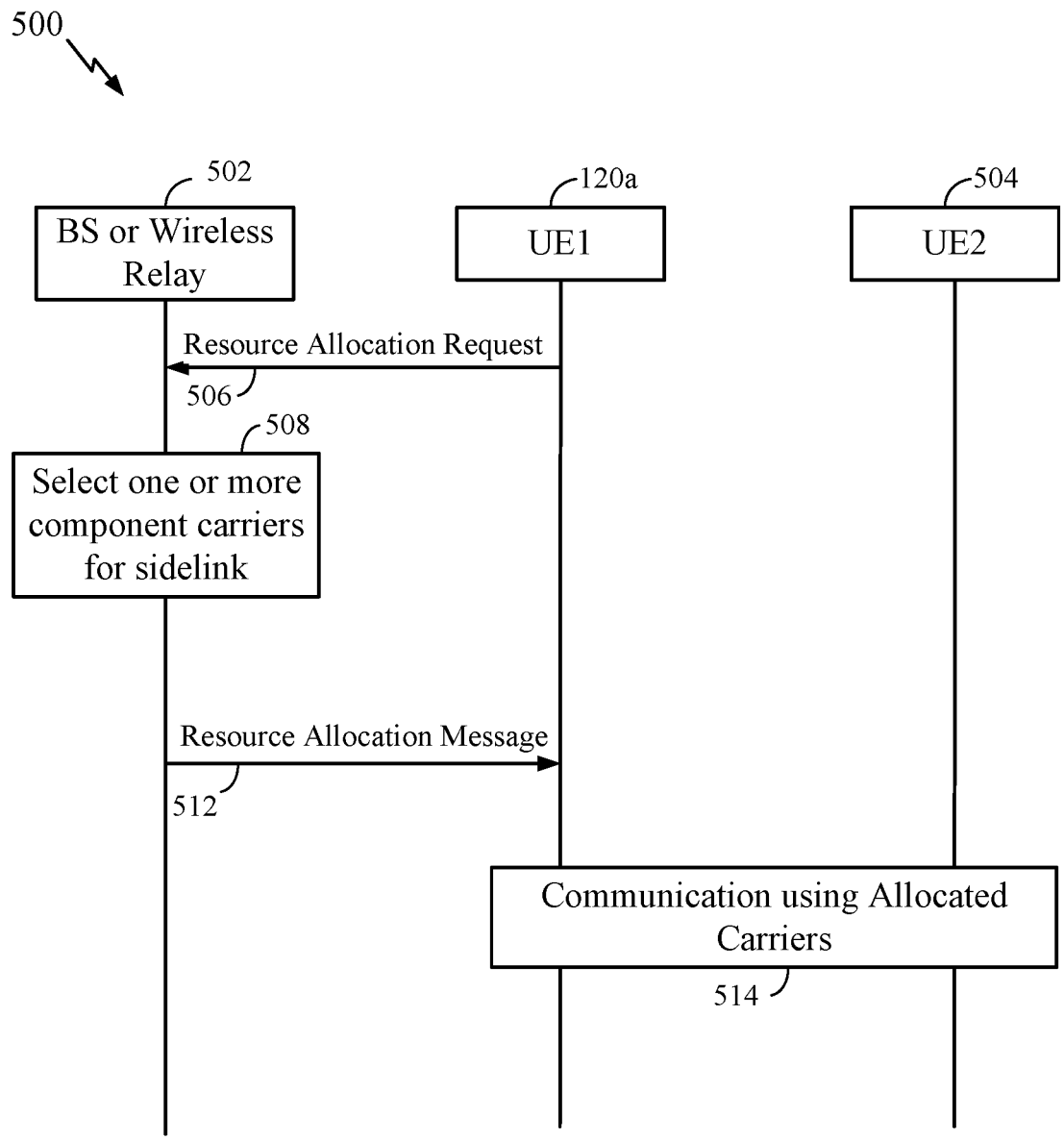
FIG. 5 is a call flow diagram illustrating example operations for allocating resources for sidelink communication, in accordance with certain aspects of the present disclosure.

FIG. 5 is a call flow diagram illustrating example operations 500 for allocating resources for sidelink communication, in accordance with certain aspects of the present disclosure. As illustrated, the UE 120a may send a resource allocation request 506. The resource allocation request 506 may request allocation of resources for sidelink communication between the UE 120a and a UE 504 (e.g., corresponding to UE 120b). The resource allocation request 506 may be sent to a management entity 502, such as a BS or a UE acting as a wireless relay. For example, with respect to the wireless communication network 200, the resource allocation request 506 may be sent from the UE 204 (e.g., corresponding to UE 120a of FIG. 4) to the UE 206 acting as a wireless relay. The UE 206 may relay the request to the BS 210 to allocate the CCs for the sidelink communication. The allocation may be sent back to the UE 204 through the UE 206 in a similar manner. In some cases, the resource allocation request 506 may be sent through BSs. For instance, the resource allocation request 506 may be sent from UE 204 to the BS 210 (e.g., via UE 206) and the BS may relay the request through the backhaul interface 250 to the BS 208 for allocating of the resources.

As illustrated, at block 508, the management entity 502 (e.g., BS 110a) may select one or more CCs for the sidelink communication, and send a resource allocation message 512 to the UE 120a allocating the one or more CCs. At block 514, the allocated CCs may be used for sidelink communication between the UE 120a and UE 504.

Figure 6:
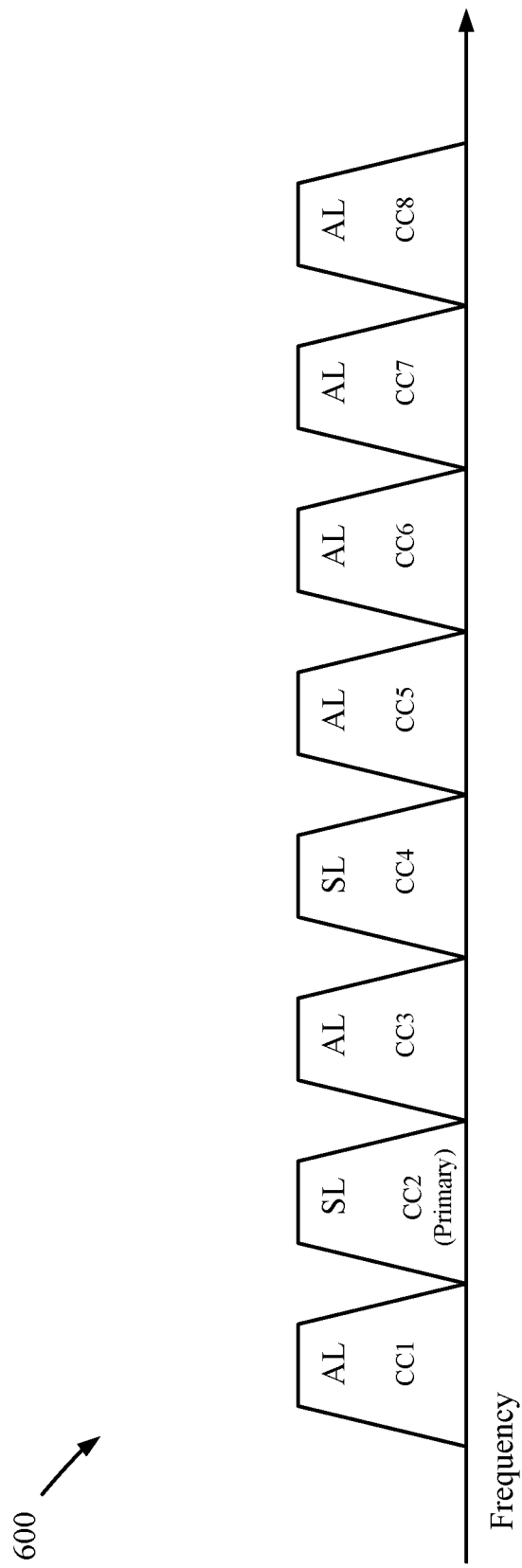
FIG. 6 illustrates multiple component carriers (CCs), one or more of which may be allocated for sidelink communication, in accordance with certain aspects of the present disclosure.

FIG. 6 illustrates multiple CCs 600, one or more of which may be allocated for sidelink communication, in accordance with certain aspects of the present disclosure. In certain aspects, a total of N carriers may be available (N being an integer greater than or equal to two), each of the carriers having one or more bandwidth parts (BWPs) for sidelink operation. For example, 8 CCs may be available, as illustrated in FIG. 6. The BS may allocate a subset of the CCs 600 for the sidelink communication. For instance, CC2 and CC4 may be allocated for sidelink communication, and the remaining CCs may be allocated for access link communication, as illustrated.

In certain aspects, one of the CCs (e.g., CC2) may be configured as a primary CC for sidelink communication, and the remaining CC(s) allocated for sidelink communication may be secondary CCs. The primary CC may be used for communication of various control signaling that may be applicable to all carriers including the primary and secondary CCs. For example, the primary CC may contain a synchronization signal block (SSB), random access channel (RACH) resources, or resources for beam or radio link failure recovery for sidelink communications. In another example, one or more of other sidelink control or signaling channels such as channel state information-reference signal (CSI-RS), physical sidelink feedback channel (PSFCH) may only be present in the primary CC, and may carry indications for the other CCs. For example, sidelink hybrid automatic request (HARQ)-acknowledgment (Ack) or beam-failure indications for all the sidelink CCs could be carried on the primary sidelink CC. In another example, the primary cell (PCell) or primary secondary cell (PSCell), if selected as one of the CCs for sidelink communication, may also serve as the primary CC for sidelink communication. In another example, the CC configured as the primary sidelink CC may depend on the set of UEs with which the UE intends to communicate with, and may only carry the signaling channels for sidelinks with the UEs in that set. In another example, there may be multiple primary sidelink CCs, one for each such set of UEs.

Figure 7:
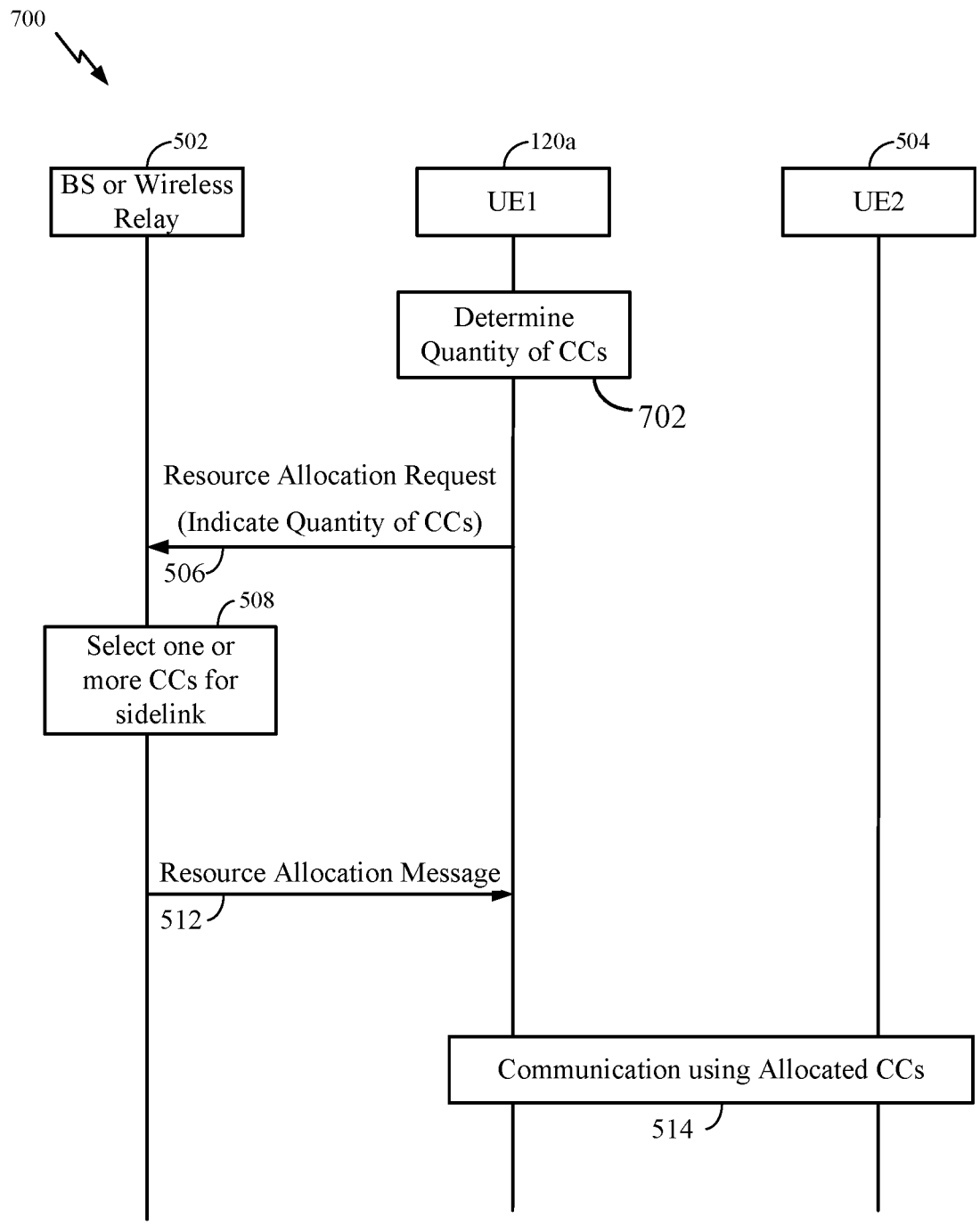
FIG. 7 is a call flow diagram illustrating example operations for requesting a quantity of CCs for sidelink communication, in accordance with certain aspects of the present disclosure.

FIG. 7 is a call flow diagram illustrating example operations 700 for requesting a quantity of CCs for sidelink communication, in accordance with certain aspects of the present disclosure. As illustrated, at block 702, the UE 120a may determine a quantity of CCs to request for the sidelink communication. For instance, the UE 120a may determine the quantity of CCs based on UE capability (e.g., how many CCs the UE 120a and/or UE 504 are able support). As another example, the UE may determine the quantity of CCs based on an amount of traffic anticipated for the sidelink communication. The resource allocation request 506 may indicate the preferred quantity of CCs to the BS for consideration when allocating resources for the sidelink communication. For instance, the BS may allocate the UE's preferred quantity of CCs, or may allocate less CCs depending on various consideration at the BS.

Figure 8:
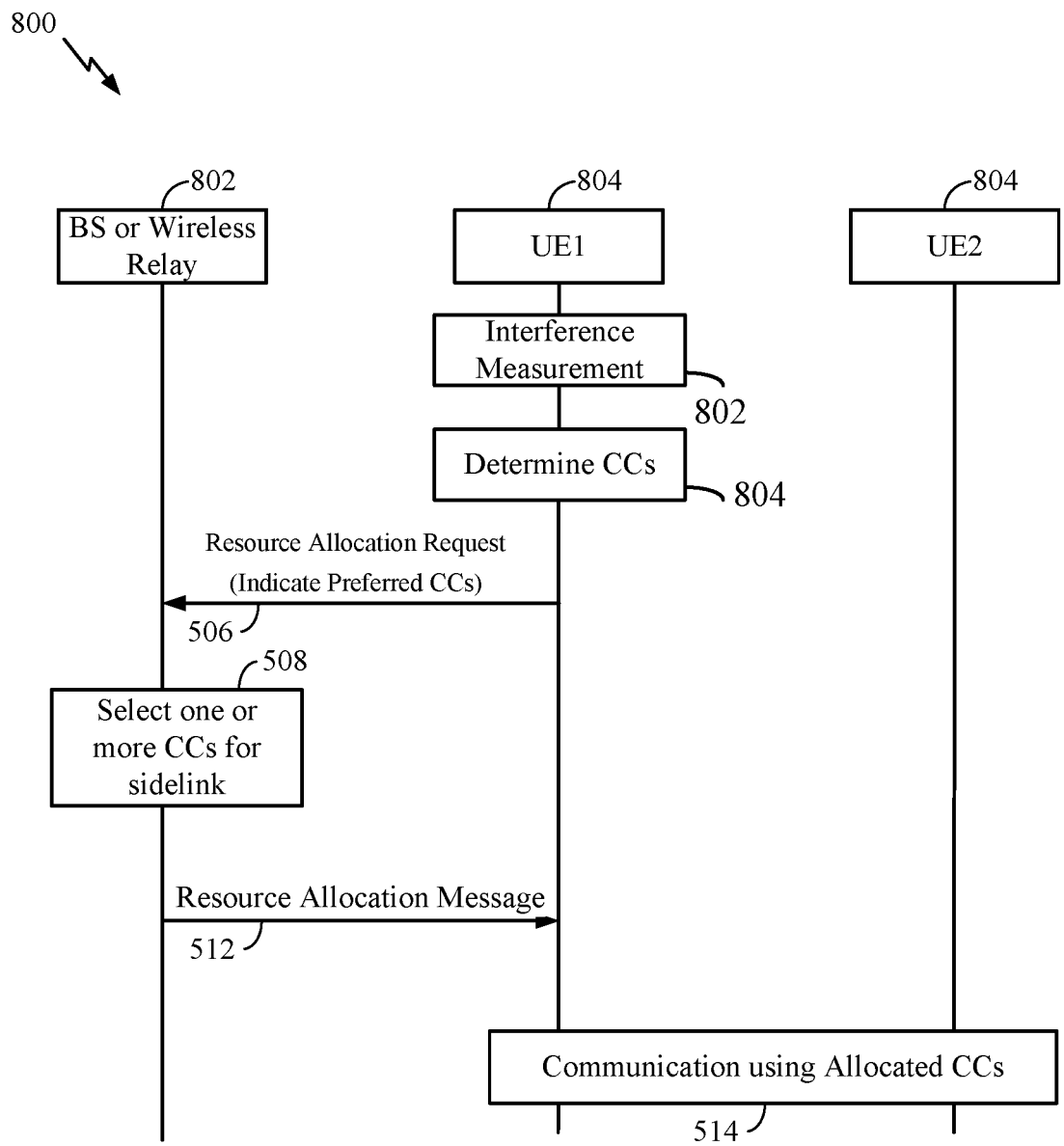
FIG. 8 is a call flow diagram illustrating example operations for requesting a specific CC to be allocated for sidelink communication, in accordance with certain aspects of the present disclosure.

FIG. 8 is a call flow diagram illustrating example operations 800 for requesting a specific CC to be allocated for sidelink communication, in accordance with certain aspects of the present disclosure. For example, at block 802, the UE may determine an amount of interference associated with the CCs (e.g., CCs 600) with respect to the sidelink communication, and at block 804, select one or more CCs with the least amount of interference. The resource allocation request 506 may indicate the preferred CCs of the UE 120a to be considered by the BS for allocation. In otherwords, the BS may either allocate the UE's preferred CCs, or select one or more different CCs depending on various considerations at the BS.

In certain aspects, the UE 120a may select different CCs for different sidelinks. For instance, if the UE 120a is using a wide beam for sidelink communication, the sidelink communication may cause more interference as compared to using a narrow beam. Therefore, to counteract the interference, the UE 120a may indicate different preferred CCs to the BS for allocation of resources for the different sidelinks, reducing the amount of interference between the two sidelinks. In certain aspects, the CC allocation described herein may vary with time, reconfigured periodically, or preconfigured to change in accordance with a CC hopping pattern, as described in more detail with respect to FIG. 9.

Figure 9:
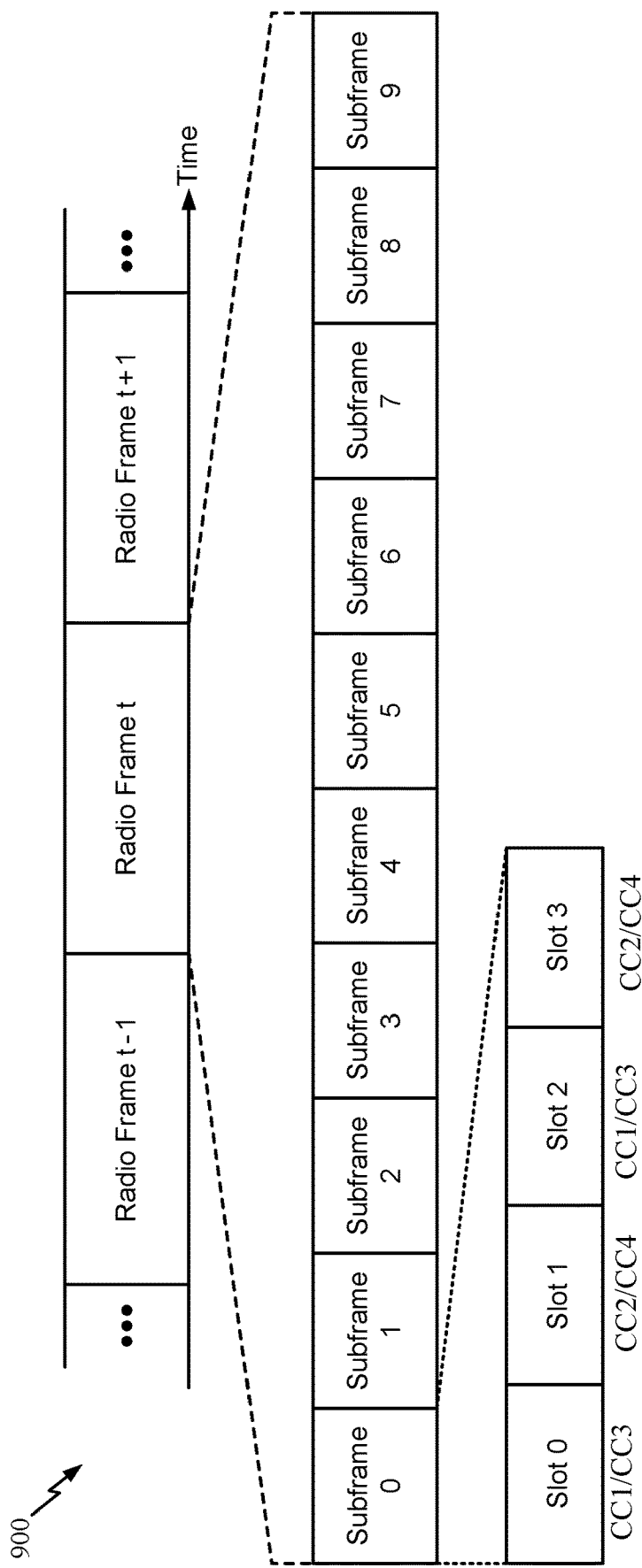
FIG. 9 is a diagram showing an example of a frame format, in accordance with certain aspects of the present disclosure.

FIG. 9 is a diagram showing an example of a frame format 900, in accordance with certain aspects of the present disclosure. The transmission timeline for each of downlink and uplink signaling may be partitioned into units of radio frames. Each radio frame may have a predetermined duration and may be partitioned into 10 subframes, with indices of 0 through 9. Each subframe may include a variable number of slots depending on subcarrier spacing. As described herein, the CC allocation may be preconfigured to change in accordance with a CC hopping pattern. For example, one or more slots of a frame may be allocated one or more CCs, and one or more other slots of the frame may be allocated one or more other CCs. For example, slot 0 and slot 2 may be allocated CC1 and CC3, and slot 1 and slot 3 may be allocated CC2/CC4, as illustrated. As described herein, sidelink communication creates interference in addition to the access link communication. Therefore, by implementing CC hopping as described herein, the additional interference caused by the sidelink may be distributed across multiple CCs. Moreover, while FIG. 9 illustrates an example frame format to facilitate understanding with regards to CC hopping, the aspects described herein may be implemented for any suitable frame format.

Figure 10:
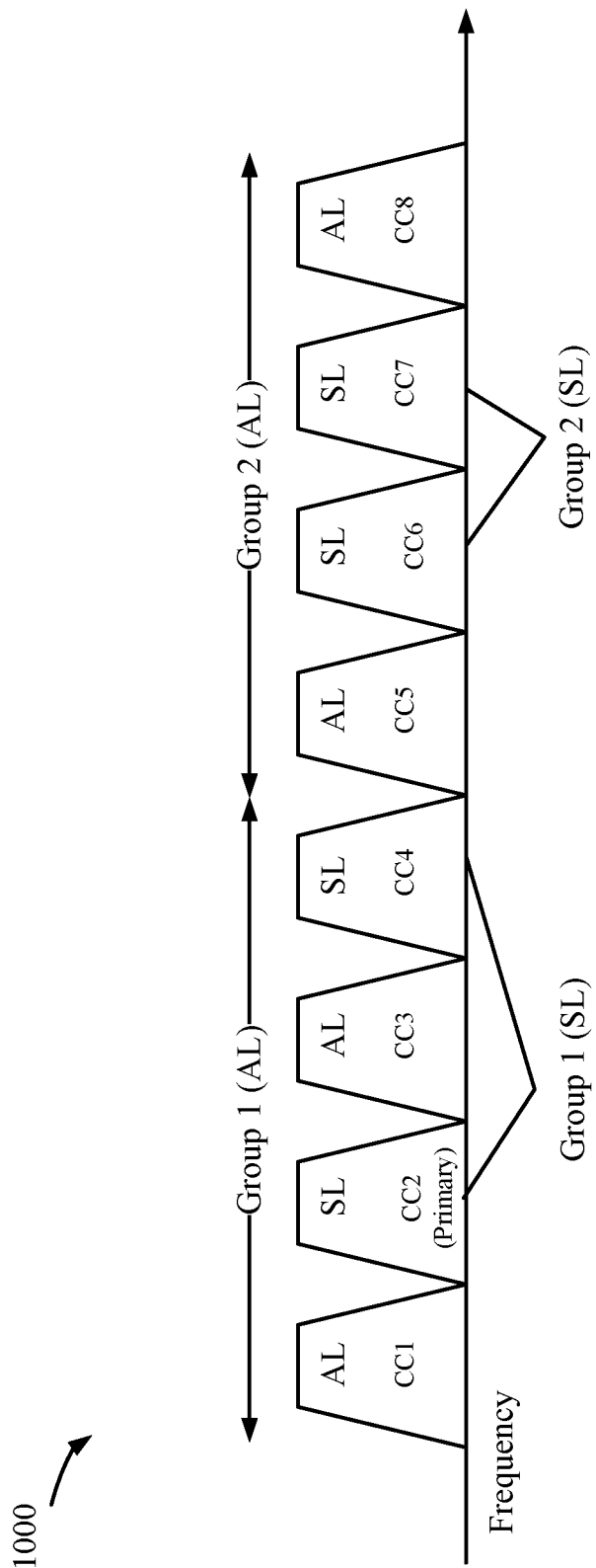
FIG. 10 illustrates multiple CCs allocated to different CC groups, in accordance with certain aspects of the present disclosure.

FIG. 10 illustrates multiple CCs 1000 allocated to different CC groups, in accordance with certain aspects of the present disclosure. In certain aspects, sidelink CCs may be assigned to be part of the same group of CCs sharing one or more common communication configuration constraints. For example, quasi co-location (QCL) parameters may be configured, activated, or changed for the CC group as a whole, instead of individually for each CC of the group. QCL may include delay, Doppler, and spatial related parameters, as defined in NR. For example, the CCs of the same group may share the same spatial transmit filter and/or receive filter at a given time. The grouping of the CCs may be configured directly by the BS or directly through the sidelink.

As an example, CC2 and CC4 for sidelink communication may be part of a physical uplink control channel (PUCCH) group for which there may be one PUCCH that carries the uplink control signals for the all the carriers in the group. As another example, CC2 and CC4 may be part of a timing advance (TA) group for which a TA parameter is adjusted together for all the CCs of the TA group. That is, when a TA adjustment command is received for a CC in the TA group, TA parameter for all the CCs in the group is adjusted accordingly. Since different signals may experience different delays when transmitted from a transmitter to a receiver, a TA parameter is used to control the timing of transmissions such that the transmissions are received at the same time or at close enough timing intervals between each other (e.g., less than a cyclic prefix duration) at the receiver to maintain orthogonality. In some cases, the CCs may be grouped due to similar beamforming constraints. For example, the same RFFE circuitry may be used for the transmission of the CCs, and as a result, the CCs may be constrained to use the same beamforming configurations.

In certain aspects, the grouping of CCs for the sidelink communication may be inherited from a grouping of CCs for the access link communication. For instance, as illustrated in FIG. 10, CCs 1-4 may be part of Group 1 for the access link and the CCs 5-8 may be part of group 2 for the access link. Moreover, CC2, CC4, CC6, and CC7 may be allocated for sidelink communication. In this case, CC2 and CC4 may be grouped together for the sidelink since CC2 and CC4 were parts of the same group for the access link, and CC6 and CC7 may be assigned to a separate group.

In some cases, the grouping of the CCs may not be inherited from the access link. For example, TA grouping of CCs may not be inherited from the access link since the CCs may experience different delays when used for transmissions on the sidelink as compared to the access link. Thus, the UE 120a may determine a different grouping of CCs that may or may not correspond to the grouping of those CCs for the access link. In some cases, the grouping may be decided by the identifiers (IDs) of the UEs participating in the sidelink operation. For example, all CCs in use between two specific UEs may be considered as part of a CC group. In some cases, the CC-grouping could be sidelink-specific. For instance, a set of CC groups may be defined for each pair of UEs that are engaging each other in sidelink traffic.

Figure 11:
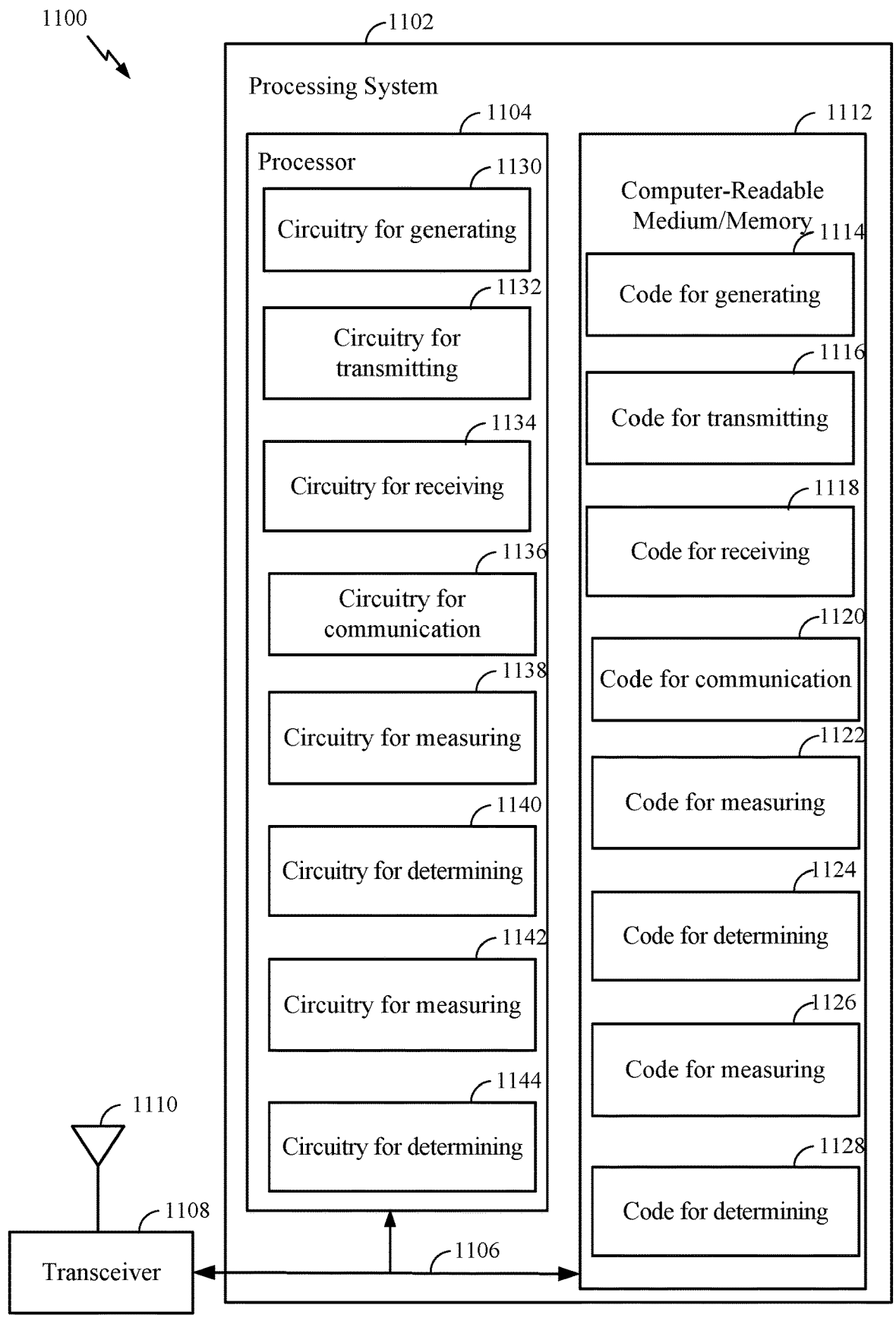
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 3 and 4. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIGS. 3 and 4, or other operations for performing the various techniques discussed herein for sidelink communication. In certain aspects, computer-readable medium/memory 1112 stores code 1114 for generating; code 1116 for transmitting; code 1118 for receiving, code 1120 for communication, code for measuring 1122, code for determining 1124, code for selecting 1126, and code for relaying 1128. In certain aspects, the processor 1104 has circuitry configured to implement the code stored in the computer-readable medium/memory 1112. The processor 1104 includes circuitry 1130 for generating; circuitry 1132 for transmitting; circuitry 1134 for receiving, circuitry 1136 for communication, circuitry for measuring 1138, circuitry for determining 1140, circuitry for selecting 1142, and circuitry for relaying 1144.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

FIG. 12 illustrates example components of BS 110a and UE 120a (e.g., in the wireless communication network 100 of FIG. 1), which may be used to implement aspects of the present disclosure.

At the BS 110a, a transmit processor 1220 may receive data from a data source 1212 and control information from a controller/processor 1240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for a physical downlink shared channel (PDSCH), etc. The processor 1220 may process (e.g., encode and symbol map) the data and control information to obtain data symbols and control symbols, respectively. The transmit processor 1220 may also generate reference symbols, such as for the primary synchronization signal (PSS), secondary synchronization signal (SSS), and cell-specific reference signal (CRS). A transmit (TX) multiple-input multiple-output (MIMO) processor 1230 may perform spatial processing (e.g., precoding) on the data symbols, the control symbols, and/or the reference symbols, if applicable, and may provide output symbol streams to the modulators (MODs) 1232a-1232t. Each modulator 1232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1232a-1232t may be transmitted via the antennas 1234a-1234t, respectively.

At the UE 120a, the antennas 1252a-1252r may receive the downlink signals from the BS 110a and may provide received signals to the demodulators (DEMODs) in transceivers 1254a-1254r, respectively. Each demodulator 1254 may condition (e.g., filter, amplify, downconvert, and digitize) a respective received signal to obtain input samples. Each demodulator may further process the input samples (e.g., for OFDM, etc.) to obtain received symbols. A MIMO detector 1256 may obtain received symbols from all the demodulators 1254a-1254r, perform MIMO detection on the received symbols if applicable, and provide detected symbols. A receive processor 1258 may process (e.g., demodulate, deinterleave, and decode) the detected symbols, provide decoded data for the UE 120a to a data sink 1260, and provide decoded control information to a controller/processor 1280.

On the uplink, at UE 120a, a transmit processor 1264 may receive and process data (e.g., for the physical uplink shared channel (PUSCH)) from a data source 1262 and control information (e.g., for the physical uplink control channel (PUCCH) from the controller/processor 1280. The transmit processor 1264 may also generate reference symbols for a reference signal (e.g., for the sounding reference signal (SRS)). The symbols from the transmit processor 1264 may be precoded by a TX MIMO processor 1266 if applicable, further processed by the demodulators in transceivers 1254a-1254r (e.g., for SC-FDM, etc.), and transmitted to the BS 110a. At the BS 110a, the uplink signals from the UE 120a may be received by the antennas 1234, processed by the modulators 1232, detected by a MIMO detector 1236 if applicable, and further processed by a receive processor 1238 to obtain decoded data and control information sent by the UE 120a. The receive processor 1238 may provide the decoded data to a data sink 1239 and the decoded control information to the controller/processor 1240.

The memories 1242 and 1282 may store data and program codes for BS 110a and UE 120a, respectively. A scheduler 1244 may schedule UEs for data transmission on the downlink and/or uplink.

The controller/processor 1280 and/or other processors and modules at the UE 120a may perform or direct the execution of processes for the techniques described herein. For example, as shown in FIG. 12, the controller/processor 1240 of the BS 110a has a sidelink manager 1241 that may be configured for allocating resources for sidelink communication, according to aspects described herein. As shown in FIG. 12, the controller/processor 1280 of the UE 120a has a sidelink manager 1243 that may be configured for requesting resources for sidelink communication, according to aspects described herein. Although shown at the Controller/Processor, other components of the UE 120a and BS 110a may be used performing the operations described herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Aspects

In a first aspect, a method for wireless communication at a first user-equipment (UE) includes generating at least one first message indicating a request for resource allocation for sidelink communication between the first UE and a second UE. The method includes transmitting the at least one first message indicating the request for the resource allocation. The method includes communicating with the second UE using the one or more first component carriers.

In a second aspect, in combination with the first aspect, the at least one first message requesting the resource allocation further indicates a quantity of the one or more first component carriers to be allocated.

In a third aspect, in combination with the second aspect, the method further includes determining an amount of traffic associated with the sidelink communication, and selecting the quantity of the one or more first component carriers based on the determination.

In a fourth aspect, in combination with one or more of the first through third aspects, the at least one first message indicating the request for the resource allocation further indicates the one or more first component carriers to be allocated.

In a fifth aspect, in combination with the fourth aspect, the method further includes measuring an interference associated with the one or more first component carriers of a plurality of component carriers, and determining the one or more first component carriers to be indicated based on the measurement of the interference associated with the one or more first component carriers.

In a sixth aspect, in combination with one or more of the first through fifth aspects, the at least one first message further indicates a request for resource allocation for sidelink communication between the first UE and a third UE, and the at least one second message further allocates one or more second component carriers, the method further including communicating with the third UE using the one or more second component carriers.

In a seventh aspect, in combination with the sixth aspect, the one or more second component carriers are different than the one or more first component carriers.

In an eighth aspect, in combination with one or more of the first through seventh aspects, the one or more first component carriers include a plurality of component carriers, the at least one second message indicating that one of the plurality of component carriers is a primary component carrier.

In a ninth aspect, in combination with one or more of the first through eighth aspects, the at least one second message indicates a pattern for hopping from the one or more first component carriers to one or more second component carriers for the communication.

In a tenth aspect, in combination with the ninth aspect, the indication of the pattern includes an indication of at least one slot of a frame to be communicated using the one or more first component carriers and at least another slot of the frame to be communicated using the one or more second component carriers.

In an eleventh aspect, in combination with one or more of the first through tenth aspects, the at least one second message allocating the one or more first component carriers further configures one or more sidelink bandwidth parts (BWPs) of each of the one or more first component carriers.

In an twelfth aspect, in combination with one or more of the first through eleventh aspects, the one or more first component carriers include a plurality of component carriers, at least two component carriers of the plurality of component carriers being part of a component carrier group sharing one or more communication configuration constraints.

In a thirteenth aspect, in combination with the twelfth aspect, the at least one second message indicates that the at least two component carriers are part of the component carrier group.

In a fourteenth aspect, in combination with one or more of the twelfth or thirteenth aspects, the component carrier group including the at least two component carriers for the sidelink communication corresponds to a component carrier grouping for an access link between the first UE and a base station.

In a fifteenth aspect, a method for wireless communication includes receiving, from a first user-equipment (UE), at least one first message indicating a request for resource allocation for sidelink communication between the first UE and a second UE. The method includes generating at least one second message allocating one or more first component carriers for the sidelink communication. The method includes transmitting the at least one second message to the first UE.

In a sixteenth aspect, in combination with the fifteenth aspect, the at least one first message indicating the request for the resource allocation further indicates a quantity of the one or more first component carriers to be allocated.

In a seventeenth aspect, in combination with one or more of the fifteenth or sixteenth aspects, the at least one first message indicating the request for the resource allocation further indicates the one or more first component carriers to be allocated.

In an eighteenth aspect, in combination with one or more of the fifteenth through seventeenth aspects, the at least one first message further indicates a request for resource allocation for sidelink communication between the first UE and a third UE, and the at least one second message further allocates one or more second component carriers for the sidelink communication between the first UE and the third UE.

In an nineteenth aspect, in combination with one or more of the fifteenth through eighteenth aspects, the one or more first component carriers include a plurality of component carriers, the at least one second message indicating that one of the plurality of component carriers is a primary component carrier.

In a twentieth aspect, in combination with one or more of the fifteenth through nineteenth aspects, the at least one second message indicates a pattern for hopping from the one or more first component carriers to one or more second component carriers for the communication.

In a twenty-first aspect, in combination with the twentieth aspect, the indication of the pattern include an indication of at least one slot of a frame to be communicated using the one or more first component carriers and at least another slot of the frame to be communicated using the one or more second component carriers.

In a twenty-second aspect, in combination with one or more of the fifteenth through twenty first aspects, the at least one second message allocating the one or more first component carriers further configures one or more sidelink bandwidth parts (BWPs) of each of the one or more first component carriers.

In a twenty-third aspect, in combination with one or more of the fifteenth through twenty second aspects, the one or more first component carriers include a plurality of component carriers, at least two component carriers of the plurality of component carriers being part of a component carrier group sharing one or more communication configuration constraints.

In a twenty-fourth aspect, in combination with twenty third aspect, the at least one second message indicates that the at least two component carriers are part of the component carrier group.

In a twenty-fifth aspect, in combination with one or more of the twenty third or twenty fourth aspects, the component carrier group including the at least two component carriers for the sidelink communication corresponds to a component carrier grouping for an access link between the UE and a base station.

In a twenty-sixth aspect, in combination with one or more of the fifteenth through twenty fifth aspects, the method includes relaying the request for resource allocation to a BS, and receiving, from the BS, an indication of the one or more first component carriers, the at least one second message allocating the one or more first component carriers being generated based on the indication from the BS.

In a twenty-seventh aspect, in combination with one or more of the fifteenth through twenty sixth aspects, the method includes communicating with the first UE using the one or more first component carriers.

In a twenty-eighth aspect, in combination with one or more of the fifteenth through twenty seventh aspects, the method includes selecting the one or more first component carriers for the sidelink communication, the at least one second message allocating the one or more first component carriers being generated based on the selection.

In a twenty-ninth aspect, an apparatus for wireless communication by a first UE includes a memory. The apparatus includes one or more processors coupled to the memory, the memory and the one or more processors being configured to generate at least one first message indicating a request for resource allocation for sidelink communication between the first UE and a second UE, transmit the at least one first message indicating the request for the resource allocation, receive at least one second message allocating one or more first component carriers for the sidelink communication, and communicate with the second UE using the one or more first component carriers.

In a thirtieth aspect, an apparatus for wireless communication includes a memory and one or more processors coupled to the memory. The memory and the one or more processors are configured to receive, from a first user-equipment (UE), at least one first message indicating a request for resource allocation for sidelink communication between the first UE and a second UE, generate at least one second message allocating one or more first component carriers for the sidelink communication, and transmit the at least one second message to the first UE.

In a thirty-first aspect, an apparatus for wireless communication includes a processor, memory coupled with the processor, the processor and memory configured to perform a method of any one of the first aspect to the twenty-eighth aspect.

In a thirty-second aspect, an apparatus for wireless communication includes at least one means for performing a method of any one of the first aspect to the twenty-eighth aspect.

In a thirty-third aspect, a non-transitory computer-readable medium storing code for wireless communication includes a processor, memory coupled with the processor, and instructions stored in the memory and executable by the processor to cause the apparatus to perform a method of any one of the first aspect to the twenty-eighth aspect.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication at a first user-equipment (UE), comprising:
generating at least one first message indicating a request for resource allocation for sidelink communication between the first UE and a second UE and indicating one or more first component carriers requested by the first UE for the sidelink communication, wherein the one or more first component carriers requested by the first UE for the sidelink communication are determined based on:
a previous measurement of interference associated with the one or more first component carriers, and
capabilities of the first UE for the sidelink communication;
transmitting the at least one first message indicating the request for the resource allocation;
receiving at least one second message allocating the one or more first component carriers or one or more second component carriers for the sidelink communication; and
communicating with the second UE using the one or more first component carriers or the one or more second component carriers.

2. The method of claim 1, wherein the at least one first message requesting the resource allocation further indicates a quantity of the one or more first component carriers to be allocated.

3. The method of claim 2, further comprising:
determining an amount of traffic associated with the sidelink communication; and
selecting the quantity of the one or more first component carriers based on the determination.

4. The method of claim 1, further comprising:
measuring the interference associated with the one or more first component carriers; and
determining the one or more first component carriers to be indicated in the at least one first message based on the previous measurement of the interference associated with the one or more first component carriers.

5. The method of claim 1, wherein:
the at least one first message further indicates a request for resource allocation for sidelink communication between the first UE and a third UE; and
the at least one second message further allocates one or more third component carriers, the method further comprising communicating with the third UE using the one or more third component carriers.

6. The method of claim 5, wherein the one or more third component carriers are different than the one or more first component carriers.

7. The method of claim 1, wherein the one or more first component carriers or the one or more second component carriers comprise a plurality of component carriers, the at least one second message indicating that one of the plurality of the first or the second component carriers is a primary component carrier.

8. The method of claim 1, wherein the at least one second message indicates a pattern for hopping from the one or more first component carriers or the one or more second component carriers to one or more third component carriers for the communication.

9. The method of claim 8, wherein the indication of the pattern comprises an indication of at least one slot of a frame to be communicated using the one or more first component carriers or the one or more second component carriers and at least another slot of the frame to be communicated using the one or more third component carriers.

10. The method of claim 1, wherein the at least one second message allocating the one or more first component carriers or the one or more second component carriers further configures one or more sidelink bandwidth parts (BWPs) of each of the one or more first component carriers or the one or more second component carriers.

11. The method of claim 1, wherein the one or more first component carriers or the one or more second component carriers comprise a plurality of component carriers, at least two component carriers of the plurality of component carriers being part of a component carrier group sharing one or more communication configuration constraints.

12. The method of claim 11, wherein the at least one second message indicates that the at least two component carriers are part of the component carrier group.

13. The method of claim 11, wherein the component carrier group including the at least two component carriers for the sidelink communication corresponds to a component carrier grouping for an access link between the first UE and a base station.

14. A method for wireless communication, comprising:
receiving, from a first user-equipment (UE), at least one first message indicating a request for resource allocation for sidelink communication between the first UE and a second UE and indicating one or more first component carriers requested by the first UE for the sidelink communication, wherein the one or more first component carriers requested by the first UE for the sidelink communication are determined based on:
a previous measurement of interference associated with the one or more first component carriers, and
capabilities of the first UE for the sidelink communication;
generating at least one second message allocating the one or more first component carriers or one or more second component carriers for the sidelink communication; and
transmitting the at least one second message to the first UE.

15. The method of claim 14, wherein the at least one first message indicating the request for the resource allocation further indicates a quantity of the one or more first component carriers to be allocated.

16. The method of claim 14, wherein:
the at least one first message further indicates a request for resource allocation for sidelink communication between the first UE and a third UE; and
the at least one second message further allocates one or more third component carriers for the sidelink communication between the first UE and the third UE.

17. The method of claim 14, wherein the one or more first component carriers or the one or more second component carriers comprise a plurality of component carriers, the at least one second message indicating that one of the plurality of the first component carriers or the second component carriers is a primary component carrier.

18. The method of claim 14, wherein the at least one second message indicates a pattern for hopping from the one or more first component carriers or the one or more second component carriers to one or more third component carriers for the communication.

19. The method of claim 18, wherein the indication of the pattern comprises an indication of at least one slot of a frame to be communicated using the one or more first component carriers or the one or more second component carriers and at least another slot of the frame to be communicated using the one or more third component carriers.

20. The method of claim 14, wherein the at least one second message allocating the one or more first component carriers or the one or more second component carriers further configures one or more sidelink bandwidth parts (BWPs) of each of the one or more first component carriers or the one or more second component carriers.

21. The method of claim 14, wherein the one or more first component carriers or the one or more second component carriers comprise a plurality of component carriers, at least two component carriers of the plurality of component carriers being part of a component carrier group sharing one or more communication configuration constraints.

22. The method of claim 21, wherein the at least one second message indicates that the at least two component carriers are part of the component carrier group.

23. The method of claim 21, wherein the component carrier group including the at least two component carriers for the sidelink communication corresponds to a component carrier grouping for an access link between the UE and a base station.

24. The method of claim 14, further comprising:
relaying the request for resource allocation to a base station (BS); and
receiving, from the BS, an indication of the one or more first component carriers or the one or more second component carriers, the at least one second message allocating the one or more first component carriers or the one or more second component carriers being generated based on the indication from the BS.

25. The method of claim 14, further comprising communicating with the first UE using the one or more first component carriers or the one or more second component carriers.

26. The method of claim 14, further comprising selecting the one or more first component carriers or the one or more second component carriers for the sidelink communication, the at least one second message allocating the one or more first component carriers or the one or more second component carriers being generated based on the selection.

27. An apparatus for wireless communication by a first user-equipment (UE), comprising:
a memory; and
one or more processors coupled to the memory, the memory comprising instructions executable by the one or more processors to cause the apparatus to:
generate at least one first message indicating a request for resource allocation for sidelink communication between the first UE and a second UE and indicating one or more first component carriers requested by the first UE for the sidelink communication, wherein the one or more first component carriers requested by the first UE for the sidelink communication are determined based on:
a previous measurement of interference associated with the one or more first component carriers, and
capabilities of the first UE for the sidelink communication;
transmit the at least one first message indicating the request for the resource allocation;
receive at least one second message allocating the one or more first component carriers or one or more second component carriers for the sidelink communication; and
communicate with the second UE using the one or more first component carriers or the one or more second component carriers.

28. An apparatus for wireless communication, comprising:
a memory; and
one or more processors coupled to the memory, the memory comprising instructions executable by the one or more processors to cause the apparatus to:
receive, from a first user-equipment (UE), at least one first message indicating a request for resource allocation for sidelink communication between the first UE and a second UE and indicating one or more first component carriers requested by the first UE for the sidelink communication, wherein the one or more first component carriers requested by the first UE for the sidelink communication are determined based on:
a previous measurement of interference associated with the one or more first component carriers, and
capabilities of the first UE for the sidelink communication;
generate at least one second message allocating the one or more first component carriers for the sidelink communication or one or more second component carriers; and
transmit the at least one second message to the first UE.

* * * * *